Nov. 23, 1926.  1,607,832

J. J. LAWLESS

SIAMESE CUT-OFF FOR FIRE HOSE

Filed Dec. 3, 1925

Inventor
John J. Lawless

Attorney

Patented Nov. 23, 1926.

1,607,832

UNITED STATES PATENT OFFICE.

JOHN JOSEPH LAWLESS, OF PORTLAND, OREGON.

SIAMESE CUT-OFF FOR FIRE HOSE.

Application filed December 3, 1925. Serial No. 73,039.

My invention relates to a method of laying fire hose across railroad and street car tracks, or across avenues of heavy vehicle traffic, in a manner to permit cars or vehicles to pass through the hose line without interrupting the flow of water therethrough; and has for its object the removal of street cars and heavy vehicles from fire zones when the movement thereof has been obstructed by hose lines.

A further object of my invention is the changing of a flow of water from one line of hose to another, without interrupting or reducing the force of said flow.

A further object of my invention is, the placing of a Siamese coupling in a hose line to divide the same into parallelly disposed hose lines, and reuniting the two hose lines by means of another Siamese coupling; and the placing of valve couplings in the hose lines intermediate the Siamese couplings, for the purpose of cutting off the flow of water in one or the other thereof.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings.

Like reference characters refer to like parts throughout the several views.

1 represents a fire hydrant, having a cut-off valve 2, attached thereon. The hose line 3, which is coupled to and leads from the valve 2, has a Siamese coupling 4, coupled to the outer end thereof. The Siamese coupling 4, divides the hose line 3, into parallelly disposed hose lines 5 and 6, which are laid across the roadway or track which is to be kept open for traffic, and are united into a single hose line 12, which has a nozzle 13, coupled at one end thereof, by the Siamese coupling 11.

Figure 1:
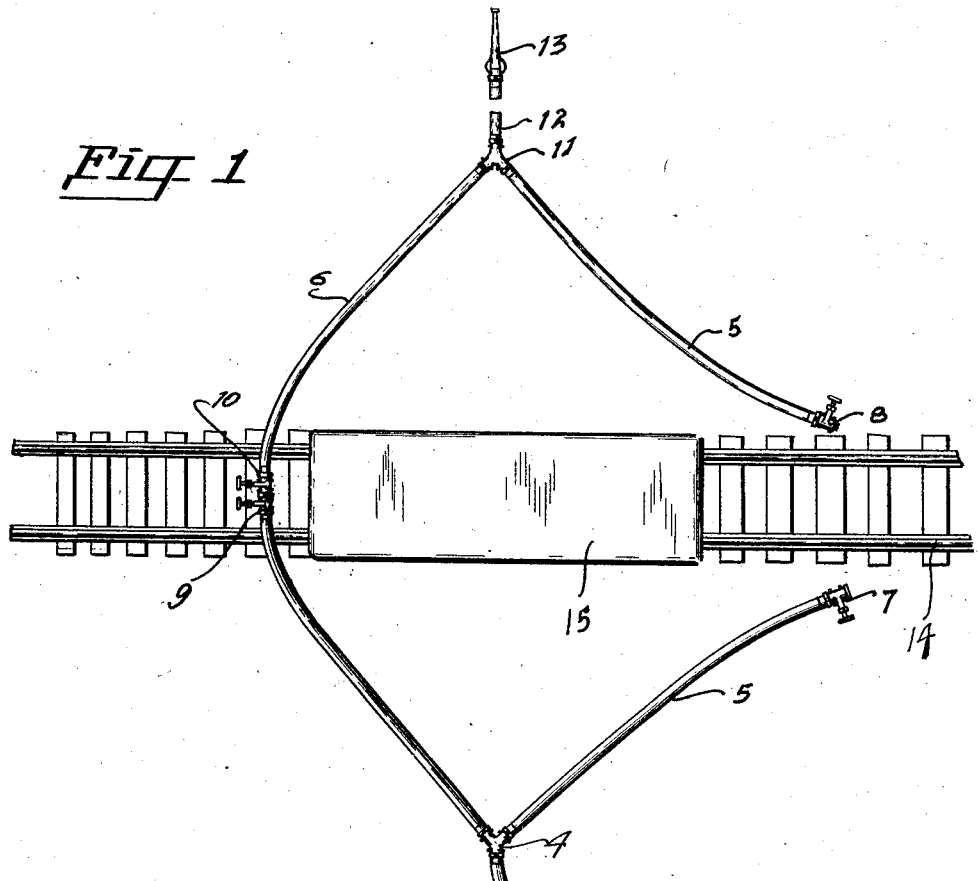
Fig. 1 is a plan view of one of my new and improved Siamese cut-offs for fire hose shown in position and in use.
Figure 2:
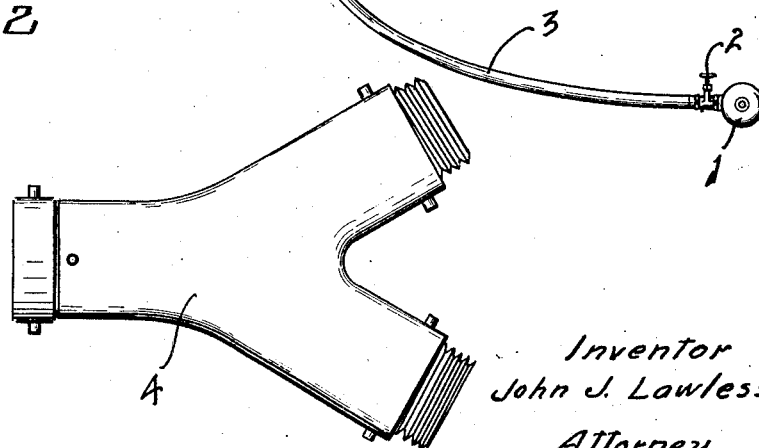
Fig. 2 is a perspective view of a Y for use in the line, and to which the hose connections may be made.

Intermediate the ends of the hose lines 5 and 6, are coupled the cut-off valve couplings 7, 8, 9, and 10. In Fig. 1 the cut-off valve couplings 7 and 8 are shown with the valves closed and uncoupled, for the purpose of allowing the car 15, on the track 14, to pass through the hose line 5. If it is desired that the car be moved in the opposite direction, the valves 7 and 8 are coupled together, and are opened, thus permitting the stream of water from hose line 3, to pass therethrough. Then valves 9 and 10 are closed and uncoupled, and the hose line 6 at each side of the valves is withdrawn from the tracks 14, and the car 15, is permitted to pass. During the entire period, while the car is being passed through the hose line, the flow of water is not interrupted or reduced, and the delivery at the nozzle 13 remains constant.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:—

1. A Siamese cut-off for fire hose, comprising a primary line of fire hose adapted to have a stream of water conducted therethrough under pressure, a primary Siamese coupling coupled thereto dividing said primary line of hose into a plurality of secondary lines of hose, cut-off valve couplings coupled within each of the said secondary hose lines and adapted to control a flow of water therethrough, and a secondary Siamese coupling coupled to said secondary hose lines and adapted to reunite said secondary hose lines into a primary line of hose.

2. A Siamese cut-off for fire hose, comprising two primary hose lines, secondary hose lines coupled therebetween, and cut-off valve couplings disposed within each of the secondary hose lines to permit the uncoupling and coupling of either of the secondary hose lines intermediate their ends.

JOHN JOSEPH LAWLESS.